US007788224B2

(12) United States Patent
Fleck et al.

(10) Patent No.: US 7,788,224 B2
(45) Date of Patent: Aug. 31, 2010

(54) FAST DATABASE REPLICATION

(75) Inventors: Andreas Fleck, Falkensee (DE); Jan Dehnel, Berlin (DE); Stefan Richter, Berlin (DE); Michael Wittrich, Berlin (DE); Frank Streichhahn, Berlin (DE)

(73) Assignee: Alcatel, Paris (FR)

( * ) Notice: Subject to any disclaimer, the term of this patent is extended or adjusted under 35 U.S.C. 154(b) by 203 days.

(21) Appl. No.: 10/939,882

(22) Filed: Sep. 14, 2004

(65) Prior Publication Data

US 2005/0080825 A1 Apr. 14, 2005

(30) Foreign Application Priority Data

Oct. 8, 2003 (EP) .................................. 03292484

(51) Int. Cl.
*G06F 17/00* (2006.01)
(52) U.S. Cl. ........................ 707/623; 707/610; 707/640; 707/674; 707/690; 707/822; 707/828; 707/661; 709/219; 709/230; 709/218; 709/203
(58) Field of Classification Search ................ 707/201, 707/102, 204, 10, 3, 610, 640, 674, 690, 707/822, 828, 661, 623; 700/3; 709/226, 709/219, 230, 218, 203; 379/220.01
See application file for complete search history.

(56) References Cited

U.S. PATENT DOCUMENTS

| | | | | |
|---|---|---|---|---|
| 4,432,057 A | * | 2/1984 | Daniell et al. .................... 707/8 |
| 5,561,797 A | * | 10/1996 | Gilles et al. ..................... 707/8 |
| 5,721,914 A | * | 2/1998 | DeVries ....................... 707/10 |
| 5,961,590 A | * | 10/1999 | Mendez et al. .............. 709/206 |
| 5,968,131 A | * | 10/1999 | Mendez et al. .............. 709/246 |
| 6,073,141 A | * | 6/2000 | Salazar ....................... 707/204 |
| 6,131,096 A | * | 10/2000 | Ng et al. ....................... 707/10 |
| 6,516,327 B1 | * | 2/2003 | Zondervan et al. .......... 707/200 |
| 6,615,223 B1 | * | 9/2003 | Shih et al. ................... 707/201 |
| 6,625,651 B1 | * | 9/2003 | Swartz et al. ............... 709/226 |
| 6,640,278 B1 | * | 10/2003 | Nolan et al. ................... 711/6 |
| 6,728,713 B1 | * | 4/2004 | Beach et al. .................. 707/10 |
| 6,839,421 B2 | * | 1/2005 | Ferraro Esparza et al. ..................... 379/220.01 |

(Continued)

OTHER PUBLICATIONS

Oracle: "Oracle9i Streams—Chapter 22" Internet Publication, Online! Oct. 2002, XP002272720.
Pardue H.: "Database Administration—Chapter 1 and 2" Internet Publication—University of South Alabama, 'Online! 2002, XP002271721.
Oracle: "Oracle9i—Database Administrations Guide—Chapter 28" Internet Publication, 'Online! Mar. 2002, XP002271722.

*Primary Examiner*—Kuen S Lu
*Assistant Examiner*—Syling Yen
(74) *Attorney, Agent, or Firm*—Sughrue Mion, PLLC

(57) ABSTRACT

The invention relates to a method for updating a remote data base with sets of data of a master data base system. The sets of data are forwarded to an intermediate data base, and the intermediate data base and the remote data base system are coupled by means of a synchronisation protocol. The protocol ensures, that the remote data base is reliably updated, wherein said master data base and said intermediate data base are logically independent data bases each part of a unique data base system controlled by a unique data base management, and also to master data base system therefore.

23 Claims, 4 Drawing Sheets

U.S. PATENT DOCUMENTS

| | | |
|---|---|---|
| 6,877,111 B2 * | 4/2005 | Sharma et al. ............... 714/13 |
| 6,934,534 B1 * | 8/2005 | Roy ........................ 455/414.1 |
| 2002/0059299 A1 * | 5/2002 | Spaey ...................... 707/104.1 |
| 2002/0107878 A1 * | 8/2002 | Tsuchida et al. ............ 707/204 |
| 2005/0114285 A1 * | 5/2005 | Cincotta ........................ 707/1 |
| 2005/0114367 A1 * | 5/2005 | Serebrennikov ............. 707/100 |
| 2005/0138216 A1 * | 6/2005 | Giles ............................ 710/1 |

* cited by examiner

FAST DATABASE REPLICATION

TECHNICAL FIELD

The invention relates to a method for updating at least one remote data base with sets of data of a master data base with sets of data of a master data base system, wherein said sets of data are forwarded to an intermediate data base, said intermediate data base and the remote data base system being coupled by means of a synchronisation protocol, said protocol ensuring, that the remote data base is reliably updated, and to a master data base system comprising sending means for transferring said sets of data to an intermediate data base, said intermediate data base and the remote data base system comprising protocol means for performing a synchronisation protocol, said protocol ensuring, that the remote data base is reliably updated. The invention is based on a priority application EP 03292484.7 which is hereby incorporated by reference.

BACKGROUND OF THE INVENTION

In the field of telecommunication, it is often necessary to update a number of remote (slave) data bases according to a master data base, the master data base e.g. located by a telecommunication service provider. Therefore, the data or subsets of data of a master data base has to be provided to each one of a number of remote slave data bases, e.g. for providing fixed number portability changing between different service providers. To keep an actual data image of one subset of data in a slave data base, an instant data filter must be provided between the master data base and said slave data base.

Every time, if new data is entered into the master data base, e.g. if a new subscriber has to be entered or if subscriber data has to be updated, this data must be sent to the remote or slave data bases. The master data base, for administrative purposes, contains more data than necessary for the control of the telecommunications network. Moreover, the master data base contains possibly information about states, that are activated in the future. Therefore the master data base has different data structure than proxy- and slave data bases.

For de-coupling of the master data base from the slave data bases, a proxy data base at service providers side is connected between the master data base and the slave data bases. Updates of the master data base are loaded into the proxy data base(s). The proxy data base carries out the further forwarding of the updates to the slave data bases. The proxy data base contains exactly the same data (data mirror), that the slave data bases should contain after updating.

However, the synchronisation of the three data bases: master, proxy and slave data base is difficult. On the other hand, maintaining multiple physical data bases at service providers side is costly. Moreover, it is not possible to perform a consistent backup of multiple physical data bases.

SUMMARY OF THE INVENTION

It is an object of the invention to propose a method for data replication, in a distributed data base system, that allows for an easy synchronisation.

This object is achieved, according to the invention, by a method for updating at least one remote data base with sets of data of a master data base with sets of data of a master data base system, wherein said sets of data are forwarded to an intermediate data base, said intermediate data base and the remote data base system being coupled by means of a synchronisation protocol, said protocol ensuring, that the remote data base is reliably updated, and to a master data base system comprising sending means for transferring said sets of data to an intermediate data base, said intermediate data base and the remote data base system comprising protocol means for performing a synchronisation protocol, said protocol ensuring, that the remote data base is reliably updated.

The basic idea of the invention is that a master data base and an intermediate or proxy data base, the proxy data base serving as replication data base for further remote data bases, are configured as logically different data bases within one physical data base the physical data base characterised in that it is controlled by a unique data base management. Updating the remote data bases with sets of data of the master data base system, the sets of data that are forwarded to the proxy data base, Said proxy data base and the remote data base system are coupled by means of a synchronisation protocol, said protocol ensuring, that the remote data base is reliably updated in a minimum of time. As the proxy data base and the master data base are realised as part of a physical data base, the synchronisation effort between the master data base and the proxy data base is minimised. Especially, the transaction performance is augmented due to the fact, that no two-phase commits are necessary.

Further refinements of the invention are to be found in the dependent claims and in the description below.

BRIEF DESCRIPTION OF THE DRAWINGS

The invention is explained further below with the aid of the accompanying drawing:

FIG. 1 shows an overall view of a distributed data base system with a service provider system or master data base system SPS and exemplary three remote or slave data base systems SAS1, SAS2 and SAS3. The data base systems SPS comprise a master data base MDB and the remote data base systems SAS1, SAS2 and SAS3 comprise each a slave data base SDB1, SDB2 and SDB3 respectively for persistent data storing. The data bases systems are connected to a communications network TN, that is preferably realised as a packet data network according to the well transmission control protocol/internet protocol (TCP/IP) suite.

Figure 1:
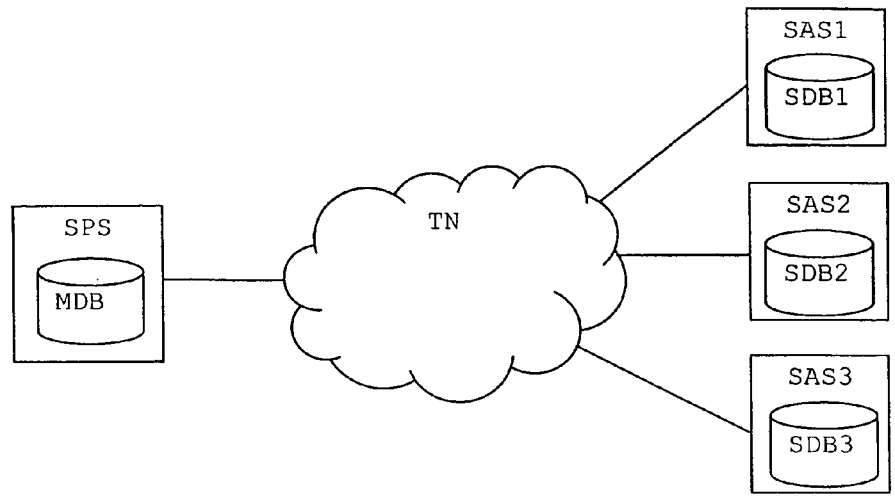
FIG. 1 shows a distributed data base system with a master data base system and remote data base systems, FIG. 2 exemplary shows a block diagram of a master data base system according to the invention and an exemplary remote data base system communicating to each other, FIG. 3 exemplary shows a more detailed block diagram of the master data base system.

Further, not shown in FIG. 1, said data base systems each comprise interface units to the communications network, agents, protocol engines and dynamic data stores. The slave data bases SDB1, SDB2 and SDB3 should be loaded with data stored in the master data base. MDB. According to the prior art, de-coupling the master data base MDB from the slave data bases, a proxy data base at service providers side, not shown here, is connected between the master data base MDB and the slave data bases SDB1, SDB2 and SDB3, the proxy data base being physically independent from the master data base MDB. Updates of the master data base MDB are loaded into the proxy data base. The proxy data base then carries out the further forwarding of the updates to the slave data bases SDB1, SDB2 and SDB3.

According to the prior art, all data bases, master data base MDB, proxy data base PDB and the slave data bases SAS1, SAS2, SAS3 are physically independent data bases. Physical independence means, that the data bases each have their own file system with each their own administration. For a transaction of data from the master data base MDB to a slave data base SDB, each transaction comprises a first transaction from the master data base to the proxy data base and a second transaction from the proxy data base to the slave data bases. To ensure data consistency, a synchronisation of those transactions is necessary. Moreover, a synchronisation is also necessary for backup and restoring.

Figure 2:
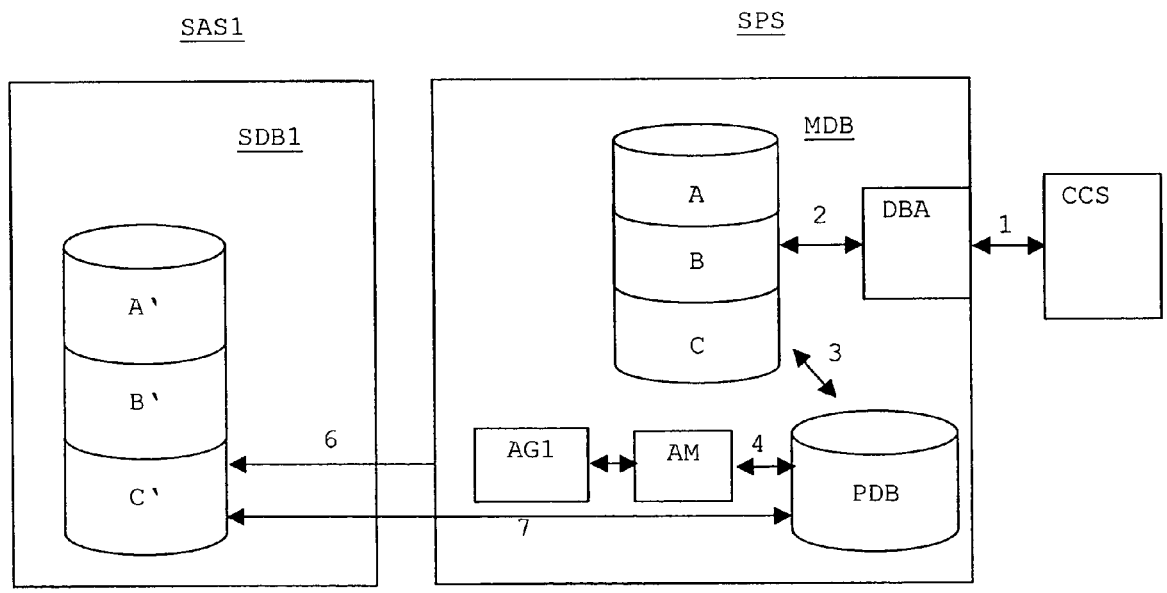

According to the invention, the master data base MDB and the proxy data base PDB are realised as one physical database. Therefore FIG. 2 shows a block diagram with a customer care system CCS, a master data base system SPS according to the invention and an exemplary remote data base SAS1. The master data base system SPS comprises a master data base agent DBA, a master data base MDB exemplary consisting of three logically different data base parts A-C, a proxy data base PDB, an audit monitor AM and a (first) proxy data base agent AG1. The (first) remote data base system SAS1 comprises a (first) slave data base SDB1 exemplary consisting of three data base parts A'-C'. Double arrows 1-7 between these units represent be-directional communication relations.

The proxy data base serves for an intermediate storage of data to be immediately transmitted to the remote data bases SAS1, SAS2 and SAS3 in a one-to-many (in the above example n=3) replication.

Within the a first communication relation user requests e.g. for entering new data is sent from the customer care system CCS to the master data base agent DBA. Within the second communication relation 2, commands for data base actions are transmitted from the master data base agent DBA to the master data base. Within the third communication relation 3, data to be distributed to the remote data base system SAS1 are sent to the proxy data base. Within the fourth, fifth and sixth communication relations 4, 5, 6, data distribution from the master data base MDB to the slave data base SDB1 is controlled. The proxy data base agent AG1 reads/writes data from/to the proxy data base PDB The audit monitor AM serves for supervising and assuring a successful replication. Within the seventh communication relation 7, the data base objects are transferred from the proxy data base PDB to the slave data base SDB1.

Exemplary, the master data base MDB and the slave data base SAS1 are each divided into three sections A, B and C or A', B' and C' respectively. Each of these section can be regarded as logical data base. For a service provisioning in a telephone system, the following services for telephone number portability might be exemplary realised, each of these services having assigned one data base segment A, B or C or A', B' or C' respectively:

Fixed number portability (FNP) containing the parts geographical number portability and local number portability:

The local number portability (LNP) is the ability of an end user of the PSTN/ISDN (public switched telephone network/integrated services digital network) to retain the same E.164 international public telephone number when changing from one service provider to another without changing their location.

Geographic number portability (GNP) is the ability of an end user to retain the same E.164 international public telephone number when moving from one location to another without changing the service provider.

Mobile Number Portability (MNP) is the ability of an end user to retain the same mobile E.164 international public telephone number when changing from one service provider to another.

For these services, each a different data base can be used on service providers side and on remote sides. Preferably, each of these data bases form on each side logically independent data bases A, B, C or A', B', C' respectively one the top of a unique physical data base system SPS or SAS respectively.

The master data base system SPS typically the following characteristics:
  ability to handle up to 100 Million entries (per application) for each 10 updates per second,
  maximum delay time per single request shall be 60 s in a network of 20 SAS servers,
  for a batch request (1000 single operations) 180 s, and
  it shall be guaranteed that no update requests are lost The master data base MDB can be exemplary realised on a combined Network Element (NE) Management/Service Management Server (CMC/SPS) with the following hardware and operating system from the company Hewlett Packard and the data base from the company Versant:
  Hardware: HP A400 or HP A500
  Software: Operating System: HP-UX 11
  Database: VDS (Versant Development Suite) 6.0.1.

The remote data bases system SAS is preferably a highly-available and distributed system with the following exemplary characteristics:
  950 NP read transactions per second,
  maximum response of 30 ms,
  20 NP data modifications per second (without restricting the maximum 950 NP real time transactions per second declared above),
  SAS shall operate in a N+1 configuration, and
  not more than 3 minutes out of service per year.

For a set of defined functions (e.g. replication), the proxy data base behaves as well as a logically independent data base from the master data base.

The data sets stored in the physical data base therefore comprise each a data base identifier for identifying to which of the logically independent data base each data set belongs to.

The concept of independent logical data bases on top of one physical data base offers the possibility to handle different databases in one transaction. There is no transaction synchronisation via different databases necessary.

With this method, in the proxy data bases on SPS side replication queues with entries of logical-object-ID's of the changed objects are administered. A so-called ReplicationSlaveSiteDriver process running on SAS side, reads the entries of this replication queue, takes them into a replication queue on SAS side and copies the changed objects into the corresponding slave data base. A cache updater, running on each SAS, eventually reads the replication queue on SAS side and copies the changes into a client cache of a corresponding application process, the changes thus becoming effective.

If the ReplicationSlaveSiteDrivers of all remote SAS systems have taken over an entry of the replication queue at SPS side, this entry is cleared there. Accordingly, an entry is cleared on SAS side, if the corresponding data is transferred into the client cache of an application process.

For flexibility reasons, it is also possible, that two or more SAS systems share one slave data base, that is installed on one of the SAS systems. Then, only one ReplicationSlaveSite Driver is provided, but for each SAS system a cache updater is provided, that updates the data in the client cache of the corresponding SAS system. The entries of the replication queue in the slave data base are the erased, if the cache updaters of all of said SAS systems have taken over the data.

No synchronisation is necessary for data backup, restoration and roll forward archives within the physical data base. Further, a fast data re-storage of the proxy data base, e.g. after a failure occurrence, the usage of roll forward archives and e.g. the usage of Versant habackup possible. Thus, the invention allows for a simple database administration on service providers side.

Figure 3:
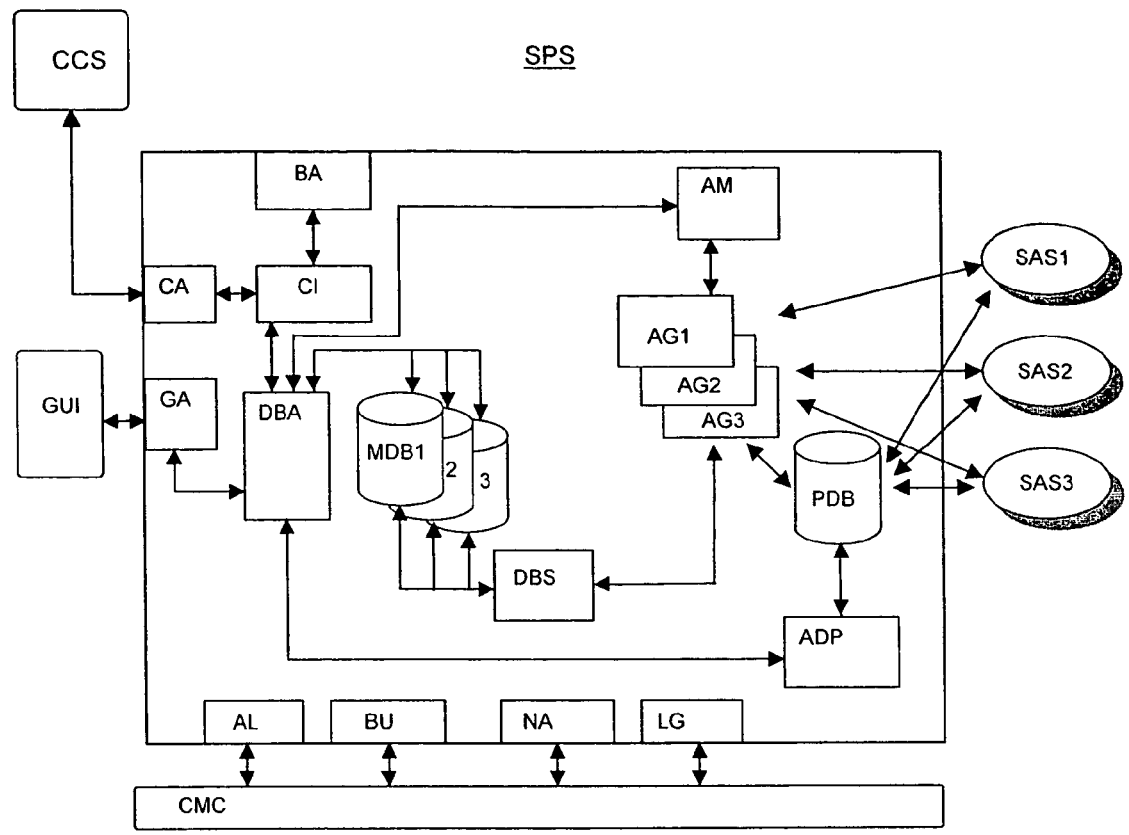

FIG. 3 exemplary shows a more detailed block diagram of the master data base system SPS of the previous figures. Over a graphical user API (application programming interface) GA, the master data base system SPS is connected to a graphical user interface GUI. Over a customer care API CA, the master data base system SPS is connected to the customer care system CCS Over an alarm interface AL, a backup interface BU, a network element administration interface NA and a logging interface LG, the master data base system SPS is connected to a management system CMC. The master data base system SPS comprises a command interpreter CI connected to the customer care API CA. Further this command interpreter is connected to a master data base DBA, that is connected over an audit monitor AM to each one of exemplary proxy data base agents AG1-AG3, to the master data base MDB consisting of exemplary three sub data bases MDB1-MDB3, over a data base adapter ADP to a proxy data base PDB and to the graphical user API GA. The proxy data base PDB is connected to the three proxy data base agents AG1-AG3. These agents are each associated to a remote data base system SAS1, SAS2 and SAS3 as well as the proxy data base PDB is associated to each those remote data bases.

The wording connection means a communication relation on the logical base. The connections have basically one main communication direction, the connections are bi-directional, as normally, a feedback (acknowledge or OK) is returned. In the following, the main units are described in more details:

Command Interpreter CI:

This unit receives commands from the customer care system CCS, performs a distribution of this commands to the different master data bases, and manages the return data to be sent back to the customer care system CCS.

Master Data Base MDB:

This unit performs the persistent storage of the complete service data.

This data is kept to be transferred to the remote slave data bases SAS1, SAS2, SAS3. Further, this data base comprises timing conditions for the transfer of the data (e.g. activation dates) and generates scheduling requests to be sent to the data base scheduler DBS.

Master Data Base Agent DBA:

This unit reads and writes data from/to the master data base MDB. It includes the complete application and data manipulation logic, performs syntactical checks, and the maintenance of the corresponding structures for object navigation. Additionally, semantic and consistency checks might be performed.

Data base Scheduler DBS:

This unit allows for time controlling data transfers. Data to be transferred to the proxy data bases with a time delay is handled by this unit.

SAS Proxy DB Agents AG1, AG2, AG3:

These agents read and write data from/to the proxy DB. The tasks of these agents include the maintenance of the database structure. They also performs an object navigation. The data base agents each maintain a pointer to a data queue of the proxy data base PDB. These pointers mark the data element in the queue, until which the elements before has been already successfully downloaded to the corresponding remote data base SAS1, SAS2, SAS3.

(SAS) Proxy Data Base PDB:

This data base serves for an intermediate storage of data to be immediately downloaded or transmitted to the remote data bases SAS1, SAS2 and SAS3 in each a one-to-many replication. The data elements to be transmitted are packed in a queue.

SAS DB Adapter ADP:

This unit converts data from the master data base MDB to the proxy data base PDB. It hides the details of the mapping between both data models (Master DB data model optimised for provisioning, SAS-Proxy for high speed access of service controls).

Audit Monitor AM:

This unit carries out a periodical comparison of the state of the master data base MDB, of the SAS proxy data base PDB and the remote data bases to prove the successful replication. On request, the audit monitor sends results back to a supervisor.

The administration Unit CMC performs administration tasks on the SPS, e.g. alarm handling, backup, network element administration and logging.

Figure 4:
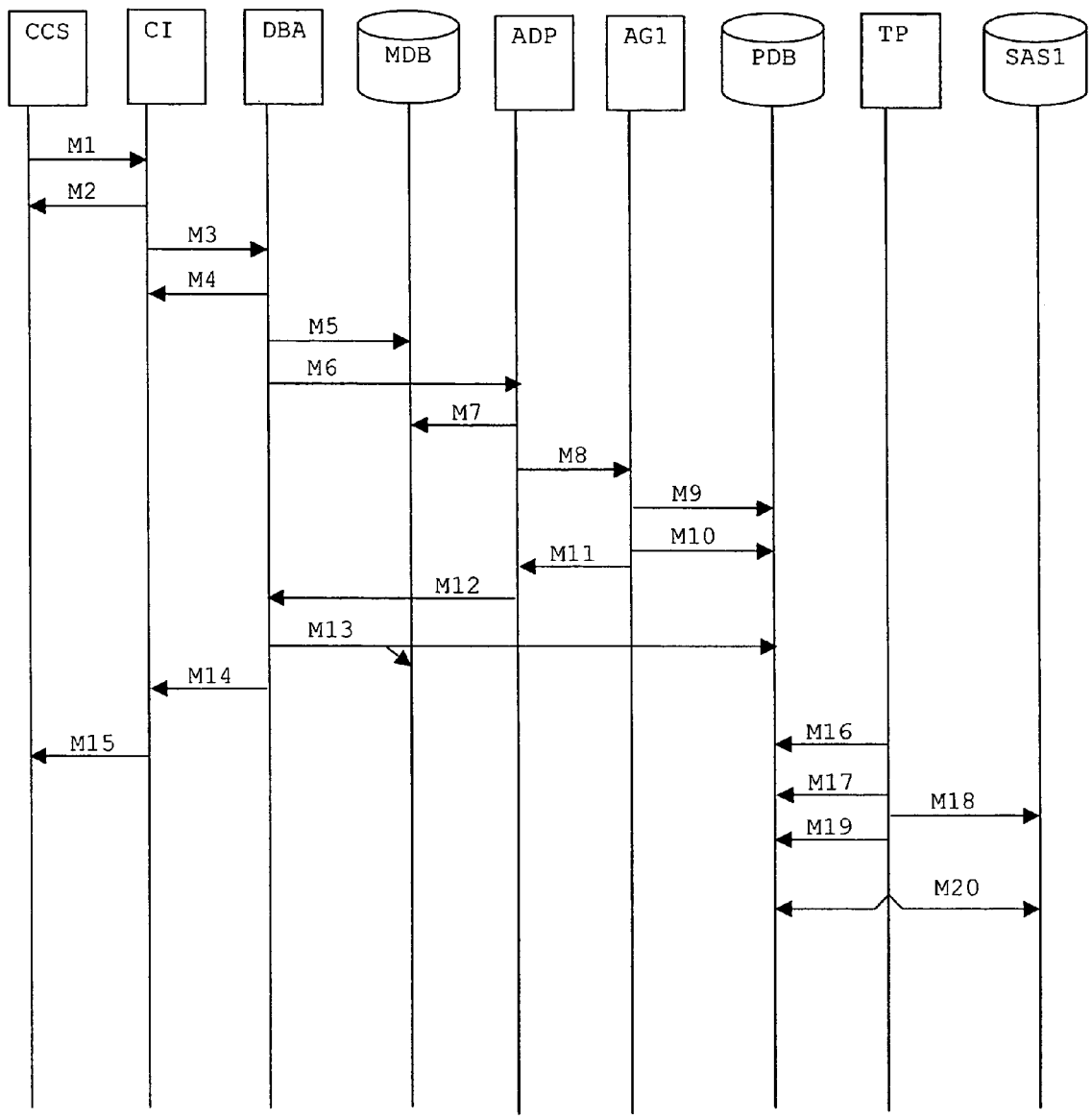
FIG. 4 shows an exemplary scenario of a database update and FIG. 5 shows a variation of the scenario of FIG. 4.

FIG. 4 shows an exemplary scenario of updating a remote database for an immediately executed update request. Therefore commands M1-M20 are exchanged between the units, explained under FIG. 3, as follows:

A first command M1 with a request is sent from the customer care system CCS to the command dispatcher or interpreter CI. The Command interpreter queues this command and sends back a second command M2 as acknowledge. After queuing, the command interpreter CI sends a third command M3 with a request to the master (data base) agent DBA, that return a fourth command M4 as acknowledge. The master agent DBA, with a fifth command M5 to the master data base MDB, initiates the updating of the corresponding objects. With a sixth command M6, the master agent DBA send an object synchronisation request to the (SAS data base) adapter ADP. The adapter ADP reads the corresponding objects from the master data base MDB, symbolised as seventh command M7, and sends an eighth command M8 with an update request to exemplary the (first) proxy (data base) agent AG1. The proxy agent AG1, with a ninth command M9 to the proxy data base PDB, initiates the updating of the corresponding objects, and with a tenth command M10 to the proxy data base PDB sends a command for creating a transfer request. It returns an eleventh command M11 with an OK back to the adapter ADP, that forwards this OK as twelfth command M12 to the master agent DBA. The master agent DBA sends thirteenth command M13 with a commit changes command both to the master data base MDB and to the proxy data base PDB. Thus, a single commit is executed over both data bases MDB and PDB.

The commit finalises update transaction between said data bases. A transaction generally consists of a set of logically dependant single actions. With a transaction, a data base is transferred from one logically consistent state into another logically consistent state. As soon as the changes of a transaction are released, they are permanently available in the data base.

After that, the master agent DBA sends a fourteenth command M14 as response to the command interpreter CI, that queues this command, before sending a fifteenth command M15 as response to the customer care system CCS. Independently, the proxy data base PDB queues the transfer requests M10 for each remote data base SAS1, SAS2, SAS3. Here, only an update of a single remote data base SAS1 is considered: A transfer processor TP reads the (queued) transfer request(s), symbolised as sixteenth command M16, reads the changes, symbolised as seventeenth command M17 and transmits the changes with an eighteenth command M18 to the remote data base SAS1. Further, the transfer processor TP sends a nineteenth command M19 with an update transfer request to the proxy data base PDB and sends twentieth command M20 with a commit command to both the proxy data base PDB and the remote data base SAS1.

Figure 5:
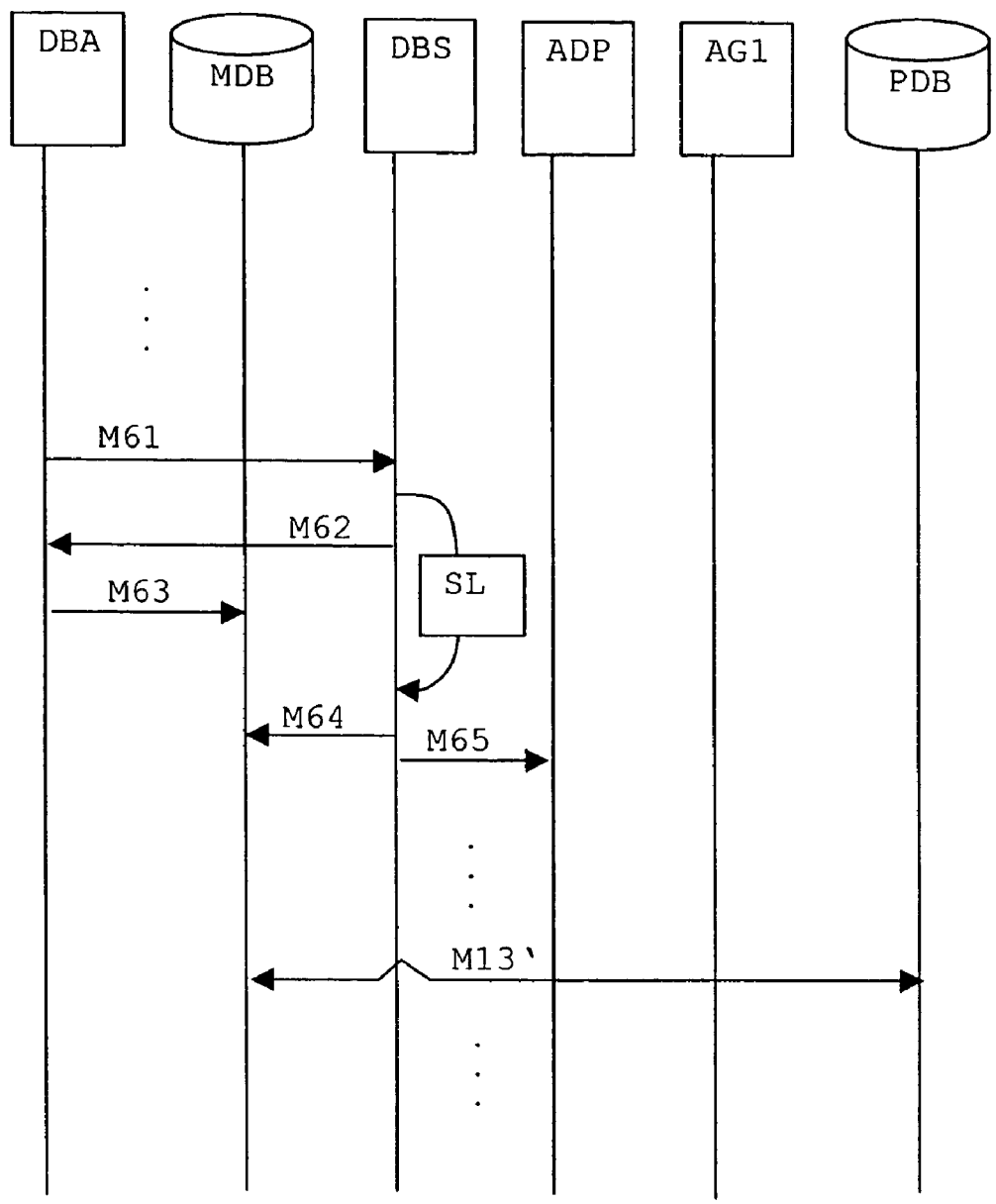

FIG. 5 shows a variation of the scenario of FIG. 4 with a scheduled update request. Therefore, a scheduler DBS is introduced (logically) in between the master data base MDB and the adapter ADP. Instead of the sixth command M6 of FIG. 3, five commands M61-M65 are executed as follows:

A first varied command M61 with a list of objects to be observed is sent from the master agent DBA to the scheduler DBS, that returns a second varied command M62 as OK. The master agent sends a third varied command M63 with a commit command to the master data base MDB. The scheduler takes up said objects into a schedule list SL. At a predefined point of time (the predefined times e.g. cyclically defined), the scheduler DBS sends a fourth varied command M64 to the master data base MDB, therewith initiating the updating of the corresponding objects. With a fifth varied command M65, the master agent DBA send an object synchronisation request to the adapter ADP. After finalisation the update transaction described under FIG. 3, instead of the master agent DBA sending the commit command M13, the scheduler DBS sends the commit command M13' to both the master data base MDB and the proxy data base PDB. The further actions of updating the remote data base remains unchanged as described under FIG. 3.

Delta Replication:

Within existing replication methods of updating object oriented data bases, complete objects are distributed from a master data base to one or more slave data bases (SAS). This means that the replication sends an object, if at least one object attribute was changed on master side. It amounts to performance problems, if many large objects are changed in short time. Although often only one or a few attributes are changed, each object is sent completely to all slave data bases (SAS).

According to a further aspect of the invention, a so-called message concept is implemented. A message object contains the changed attributes of a data base object.

These message object will be moved to the replication queue, wherein the remote data base system reads the entries of this replication queue, takes them into further a replication queue on the remote side and maps the attribute values to the corresponding mirror data base object.

Delta Replication is a message concept, that offers the advantage to send only changed attributes of a data base object to be updated. This concept thus reduces the data traffic load.

The invention claimed is:

1. A method for updating a remote data base with sets of data of a master data base, the method comprising:
   forwarding said sets of data from the master data base to an intermediate data base; and
   forwarding said sets of data from the intermediate data base to the remote data base,
   wherein the intermediate data base and the remote data base are coupled by a synchronization protocol,
   wherein said synchronization protocol ensures that the remote data base is reliably updated,
   wherein said master data base and said intermediate data base are logically independent data bases, each part of a data base system controlled by a data base management,
   wherein the master data base stores additional sets of data not stored in the intermediate data base,
   wherein the master data base stores said sets of data according to a first data model, and the intermediate data base stores said sets of data according to a second data model,
   wherein an object update of the master data base and the intermediate data base is executed within a single transaction in which a single commit is executed over the master data base and the intermediate data base,
   wherein the master data base and the intermediate data base each comprise logically independent sections, and
   wherein the logically independent sections comprise at least one of a first section storing a fixed number telephone portability information, a second section storing a local number portability type information, and a third section storing a geographical number portability type information, and a fourth section storing a mobile number portability type information.

2. A method according to claim 1, wherein the data sets of the data base system are identified to be part of the master data base or the intermediate data base by a data base identifier.

3. The method according to claim 1, wherein the data base system administers a first replication queue with entries of identifiers of changed objects, wherein a remote data base system, comprising the remote data base, reads the entries of the first replication queue, takes the read entries into a second replication queue in the remote data base system and copies the changed objects into the remote data base.

4. The method according to claim 3, wherein a cache updater, running on the remote data base system reads the second replication queue in the remote data base system and copies the changes into a client cache of a corresponding application process.

5. The method according to claim 4, wherein said sets of data are forwarded from the intermediate data base to a plurality of remote data base systems, each comprising a corresponding remote data base, and wherein an entry in the first replication queue in the data base system is cleared, if all of the plurality of remote data base systems have taken over the entry.

6. The method according to claim 1, wherein the unique data base management comprises a data backup, data restoration and roll forward archives of both the master data base and the intermediate data base at the same time.

7. A method according to claim 1, wherein an object update of both the master data base and the intermediate data base are executed within a single transaction.

8. The method according to claim 1, wherein a data base adapter converts data from the master data base to the intermediate data base, hiding details of the mapping between both the corresponding data models.

9. The method according to claim 1, wherein a data base scheduler executes received update requests by initiating a transfer of data from the master data base to the intermediate data base at predefined time points.

10. The method according to claim 1, wherein message objects are created, which contains information about changed attributes of data base objects, wherein these message objects are moved to a first replication queue, wherein a remote data base system comprising the remote data base reads the entries of the first replication queue, takes said entries into a second replication queue on the remote data base system and maps the attribute values to the corresponding mirror data base object.

11. The method according to claim 1, wherein the master data base and the intermediate data base are within a single physical data base.

12. The method according to claim 11, wherein the single physical data base is partitioned into the logically independent sections, and wherein for each of the master data base and the intermediate data base, the logically independent sections store telephone number portability information.

13. The method according to claim 12, wherein for each type of the telephone number portability information, a separate logically independent section from the plurality of logically independent sections is provided, wherein said each type of the telephone number portability information comprises the fixed number portability type information, the local number portability type information, the geographical number portability type information, and the mobile number portability type information, and wherein the single physical data base is a data base of a telecommunications service provider.

14. The method according to claim 1, wherein the data base management comprises an agent managing both the master data base and the intermediate data base and wherein, the agent executes the single commit request over both the master data base and the intermediate data base.

15. The method according to claim 1, wherein a single file system is provided for both the master data base and the intermediate data base.

16. The method according to claim 1, further comprising:
converting said sets of data from the first data model of the master data base, to the second data model of the intermediate data base, prior to forwarding said sets of data from the intermediate data base to the remote data base.

17. The method according to claim 1, wherein the first data model is optimized for provisioning.

18. The method according to claim 1, wherein the second data model is optimized for high speed access.

19. The method according to claim 1, wherein the data base management reads and writes data from and to the master data base and comprises data manipulation logic that performs syntactical checks and maintenance of corresponding structures for object navigation.

20. The method according to claim 19, wherein the data manipulation logical performs semantic and consistency checks.

21. A master data base system comprising:
means for transferring, using a processor, sets of data to an intermediate data base; and
means for controlling a master data base of said master data base system and said intermediate data base,
wherein said intermediate data base and a remote data base system comprise protocol means for performing a synchronization protocol, said synchronization protocol ensuring that the remote data base is reliably updated,
wherein said master data base and said intermediate data base are logically independent data bases each part of a unique data base system,
wherein the master data base stores additional sets of data not stored in the intermediate data base,
wherein the master data base stores said sets of data according to a first data model, the intermediate data base stores said sets of data according to a second data model,
wherein an object update of the master data base and the intermediate data base is executed within a single transaction in which a single commit is executed over the master data base and the intermediate data base,
wherein the master data base and the intermediate data base each comprise logically independent sections, and
wherein the logically independent sections comprise at least one of a first section storing a fixed number telephone portability information, a second section storing a local number portability type information, and a third section storing a geographical number portability type information, and a fourth section storing a mobile number portability type information.

22. The method according to claim 21, wherein the control means reads and writes data from and to the master data base and comprises data manipulation logic that performs syntactical checks and maintenance of corresponding structures for object navigation.

23. The method according to claim 22, wherein the data manipulation logical performs semantic and consistency checks.

* * * * *